United States Patent [19]

Hellmer

[11] Patent Number: 4,626,190
[45] Date of Patent: Dec. 2, 1986

[54] RETENTION MECHANISM FOR A SPLIT MOLD CARRIER AND CAM FOR ACTUATING THE SAME

[75] Inventor: Ernest W. Hellmer, Chicago, Ill.

[73] Assignee: Continental Plastic Containers, Stamford, Conn.

[21] Appl. No.: 749,213

[22] Filed: Jun. 27, 1985

[51] Int. Cl.⁴ .............................................. B29C 49/56
[52] U.S. Cl. ................................... 425/539; 425/182; 425/541
[58] Field of Search ................ 425/539, 540, 541, 576, 425/195, 182, 192 R, 193, 345

[56] References Cited

U.S. PATENT DOCUMENTS

| 2,453,312 | 11/1948 | Frazier | 425/192 R |
| 3,025,561 | 3/1962 | Ruekberg et al. | 425/540 |
| 3,310,834 | 3/1967 | Simpson et al. | 425/182 |
| 3,696,736 | 10/1972 | Studli | 425/192 |
| 3,825,396 | 7/1974 | Kontz | 425/541 |
| 4,555,228 | 11/1985 | Nishiike et al. | 425/192 R |

FOREIGN PATENT DOCUMENTS 808324 10/1981 U.S.S.R. ............................... 425/182

Primary Examiner—Tim Miles
Attorney, Agent, or Firm—Charles E. Brown

[57] ABSTRACT

Blow molding apparatus wherein halves of a split mold are carried by mold carriers. The mold carriers normally include one fixed mold carrier and one movable mold carrier which is positioned by way of a cam follower and associated cams. When the mold closes, the mold carriers come into closed relation with respect to one another. The mold carriers are provided with locking flanges which are engaged by C-shaped retaining members so as to prevent the material separation of the mold carriers. Then a pressure pack within the mold carriers is expanded so as to clamp the mold halves together. A simplified linkage is provided for, in conjunction with a cam follower and cams, to move the retaining members between retaining positions and release positions. The cams are mounted for adjustment normal to the direction of movement of the mold carriers and may be adjusted in that normal position to compensate for adjusted positions of the mold carriers in accordance with different size molds. Further, each cam includes a floating cam element which is spring loaded to an operative position, but is movable by a cam follower of a mold carrier in the event of improper alignment of parts so as to prevent damage to parts and linkage. The cam element is held in an operative position by a compressible spring and when the cam element moves beyond a certain restricted limit, it will actuate a switch so as to stop the operation of the blow molding apparatus.

16 Claims, 10 Drawing Figures

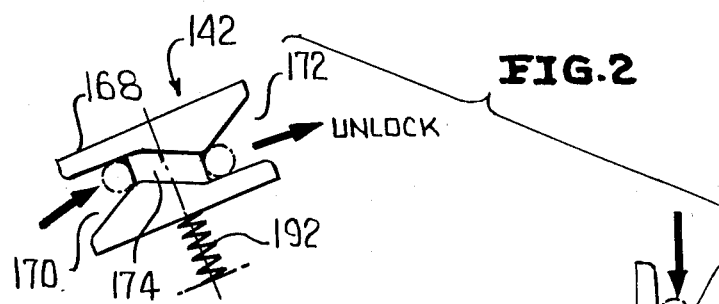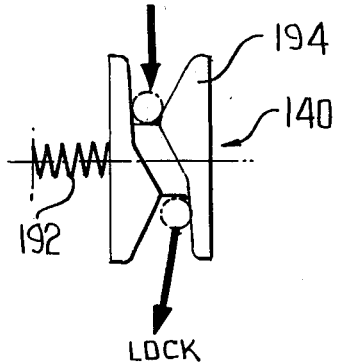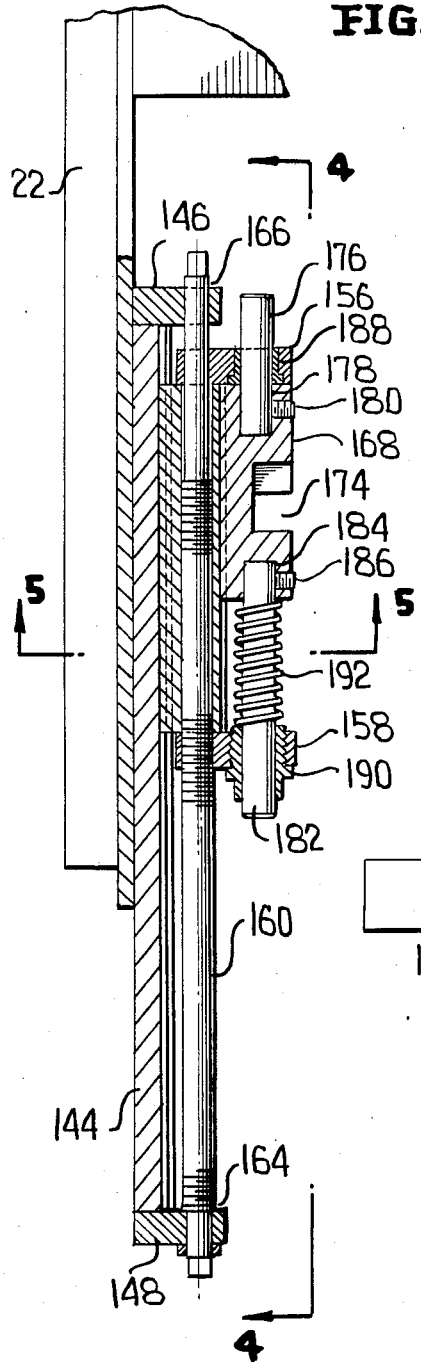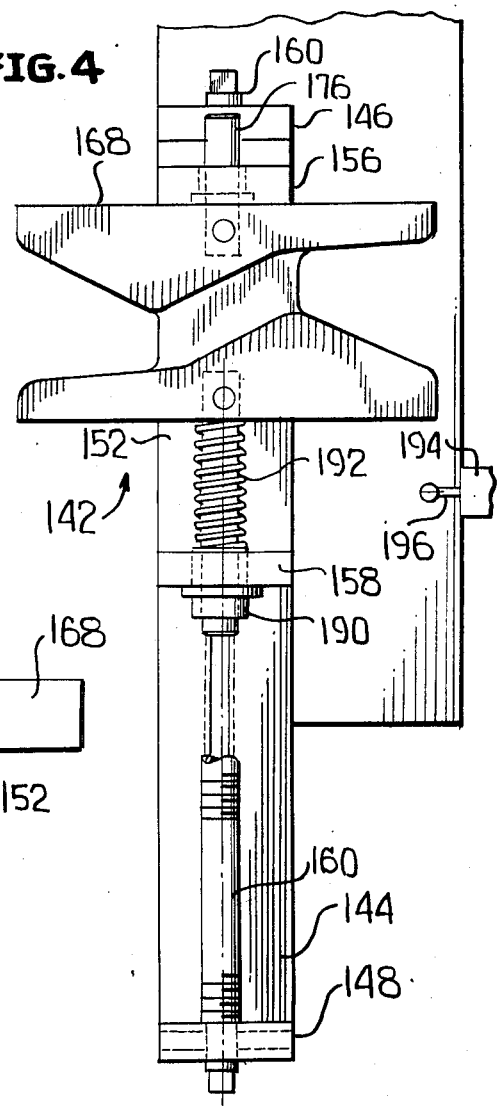

RETENTION MECHANISM FOR A SPLIT MOLD CARRIER AND CAM FOR ACTUATING THE SAME

This invention relates to a mold supporting unit for a molding apparatus of the type utilizing split molds, and more particularly to a blow molding apparatus.

There has been developed a supporting unit for a split mold including mold carriers. The mold carriers are constructed in a manner wherein each mold carrier supports one half of a split mold and the mold carriers are mounted for movement toward and away from one another between an open position and a closed position. One of the mold carriers has mounted therein in a fixed relation one mold half. The other of the mold carriers has mounted therein in association with a pressure pack, the other mold half. The mold carriers are brought together and then locked together after which the pressure pack is actuated so as to effect a pressure forcing together of the mold halves. In order that the carriers will not separate at this time, there must be provided means for locking the carriers together. The locking means must be of a simple construction, yet have sufficient strength to prevent the undesired separation of the carriers under internal pressure.

In accordance with the foregoing, this is accomplished by providing opposed locking flanges on the carriers and equipping one of the carriers with C-shaped retaining members which engage over the locking flanges.

Another feature of the invention is the simplicity of mounting and retaining members for ease of movement between retaining positions and releasing positions.

The retaining members are actuated by cam followers which engage stationary cams as the mold units move about a fixed axis. However, in the past there has been experienced difficulties when the carriers are not properly positioned relative to each other and an attempt is made to pivot the retaining members to their carrier locking positions. In accordance with this invention, the cams are resiliently mounted so that should there be an appreciable resisting force, the cams will shift as opposed to damaging the control linkage for actuating the retaining members.

It is to be understood that the carriers may be adjusted radially of the molding apparatus to accommodate molds of different sizes. This results in a radial shifting of the cam followers for actuating the retaining members. In order that the cams may be positioned for properly engaging the cam followers, means are also provided for mounting the cams for radial adjusted positioning.

With the above and other objects in view that will hereinafter appear, the nature of the invention will be more clearly understood by reference to the following detailed description, the appended claims, and the several views illustrated in the accompanying drawings.

FIG. 2 is an enlarged fragmentary schematic view showing the general relationship of the cams and the resilient mounting thereof.

FIG. 3 is a longitudinal sectional view taken through one of the cams and the mounting therefor and shows the specific details of the mounting.

FIG. 4 is a fragmentary elevational view taken generally along the line 4—4 of FIG. 3 and shows further the details of mounting of a cam element.

FIG. 5 is a transverse sectional view taken generally along the line 5—5 of FIG. 3.

Figure 1:
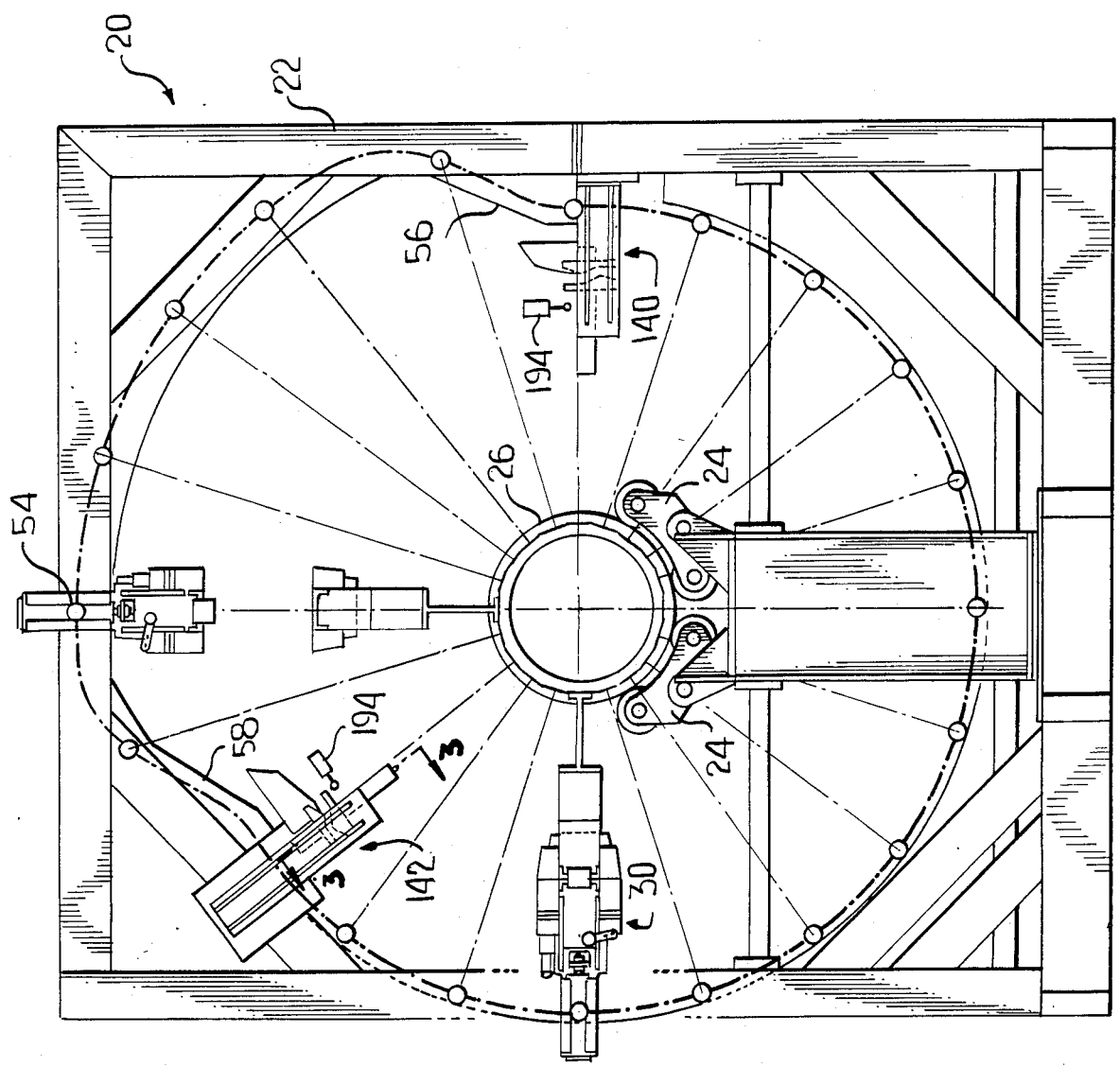
FIG. 1 is a schematic elevational view showing basically a blow molding machine formed in accordance with this invention and the mounting of the cams for effecting pivoting of the retention members.
Figure 7:
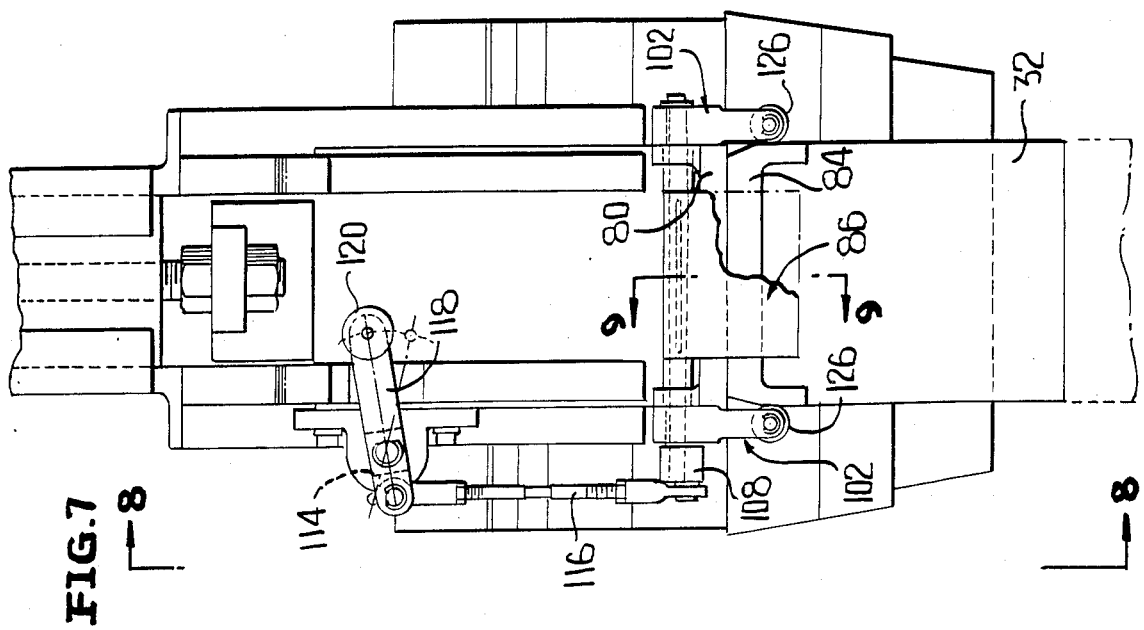
FIG. 7 is a front elevational view of one of the mold supporting units with the carriers thereof in their closed position.

Referring now to the drawings in detail, the environment of the invention is best illustrated in FIG. 1 which is an elevational view of a blow molding apparatus which incorporates split molds with one half of each mold being fixedly mounted except for rotation and the other half of that blow mold being mounted for radial movement.

The blow molding apparatus is generally identified by the numeral 20 and includes a rigid supporting frame 22. The supporting frame 22 includes support roller units 24 which support for rotation a large diameter tube or hollow shaft 26.

It is to be understood that the hollow shaft 26 will carry a plurality of radiating spokes 28 (FIG. 8) which are rigidly joined together at their outer ends. Each radiating spoke 28 carries a split blow molding unit, generally identified by the unit 30.

Figure 8:
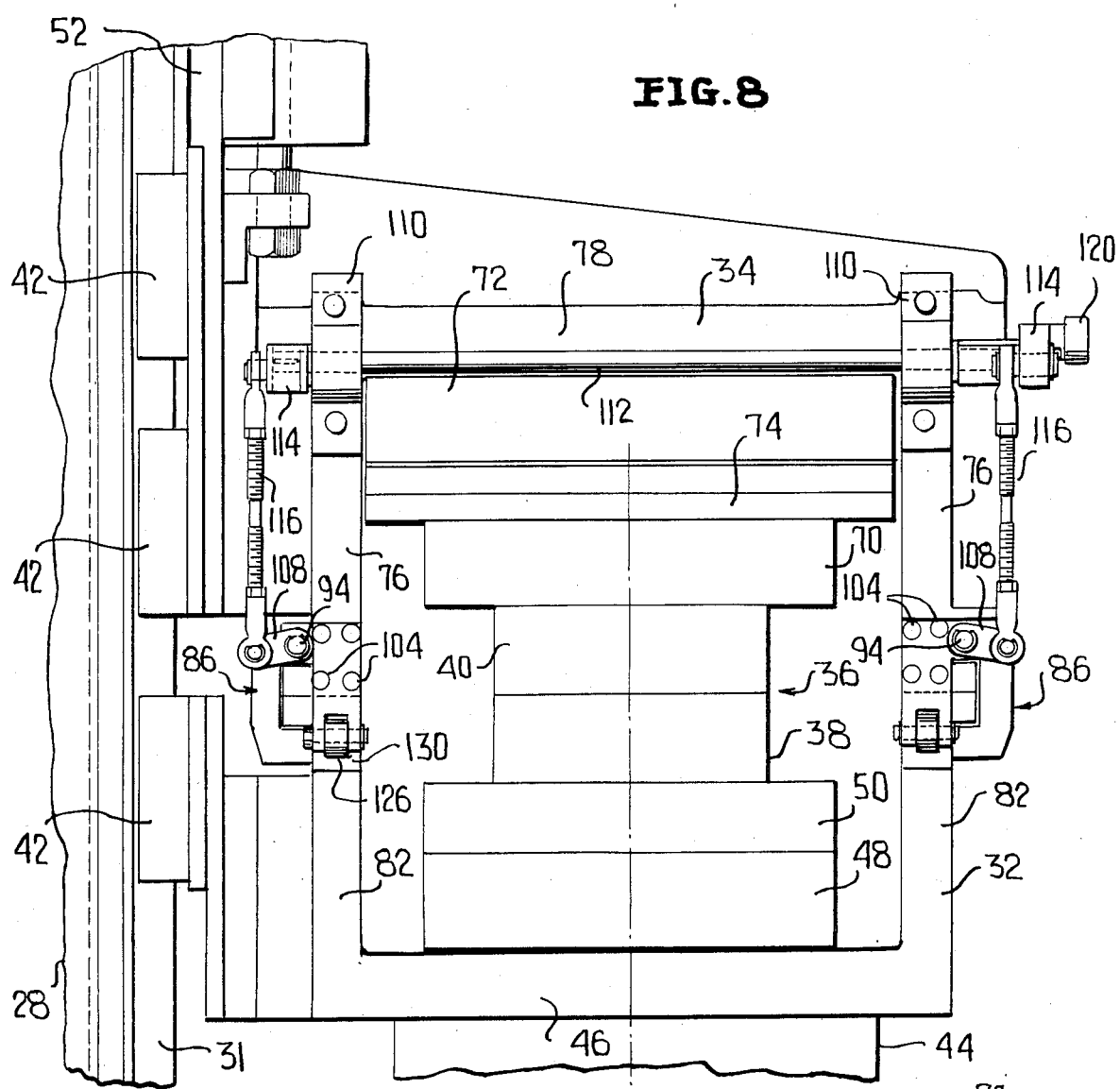
FIG. 8 is a fragmentary elevational view taken generally along the line 8—8 of FIG. 7 and shows further the manner in which the carriers are retained in their closed relation.

Referring now to FIG. 8, it will be seen that carried by each spoke 28 is a track 31. An inner carrier 32 and an outer carrier 34 are mounted on the track 31 in radially aligned relation. As is clear from FIG. 6, each of the carriers 32 and 34 is generally U-shaped in outline with the carriers opening towards one another. A split mold, generally identified by the numeral 36 has an inner half 38 thereof mounted within the carrier 32 and an outer half 40 thereof mounted within the carrier 34.

The carrier 32 is adjustably mounted on the track 31 for radial adjustment movement by means of a bearing unit 42. However, in its adjusted position, the carrier 32 is fixed against radial movement by way of replaceable or interchangeable supports 44 which are secured to a base 46 of the carrier 32 and to the shaft 26.

The carrier 32 has replaceably fixedly seated therein spacers 48, 50 with the inner mold half 38 being suitably fixedly secured to the spacer 50.

The carrier 34, which is radially outermost, is mounted for radial reciprocatory movement on the track 31 by a pair of the bearing units 42. The carrier 34 is fixedly secured to a support member 52 which carries the bearing units 42. In order to effect a controlled radial reciprocation of the carrier 34, there is carried by the support unit 52 a cam follower 54. The cam follower 54 of each mold unit, will engage a closing cam 56 and an opening cam 58 fixedly mounted on the frame 22.

Each cam follower 54 is radially adjustable relative to its support unit 52 by being mounted on a radially adjustable support member in a manner which does not form part of this invention.

The radially outer mold half 40 is mounted with the carrier 34 by means of a suitable spacer 70, which is replaceable, and more particularly by means of a pressure pack 72. The pressure pack 72 includes a mounting plate 74 to which the spacer 70 is removably secured. The radially outer mold half 40, in turn, is removably secured to the spacer 70.

It is to be understood that in the operation of the blow molding apparatus 20, the cam follower 50, in association with the closing cam 56, will move the carrier 34 radially inwardly until it is substantially in abutting relation with respect to the carrier 32. At this time the mold 36 has the halves 38, 40 thereof in substantially closed relation but wherein the halves 38, 40 are not fully touching one another.

When the carriers 32, 34 are in the "closed" position thereof, it is necessary to lock the carriers in such relationship so that when the pressure pack 72 is energized, separation of the carriers 32, 34 is restricted. The stroke of the pressure pack 72 is one wherein the mold halves 38, 40 are tightly clamped together under the desired pressure conditions.

One feature of this invention relates to the retention of the carriers 32, 34 in their "closed" position.

Figure 6:
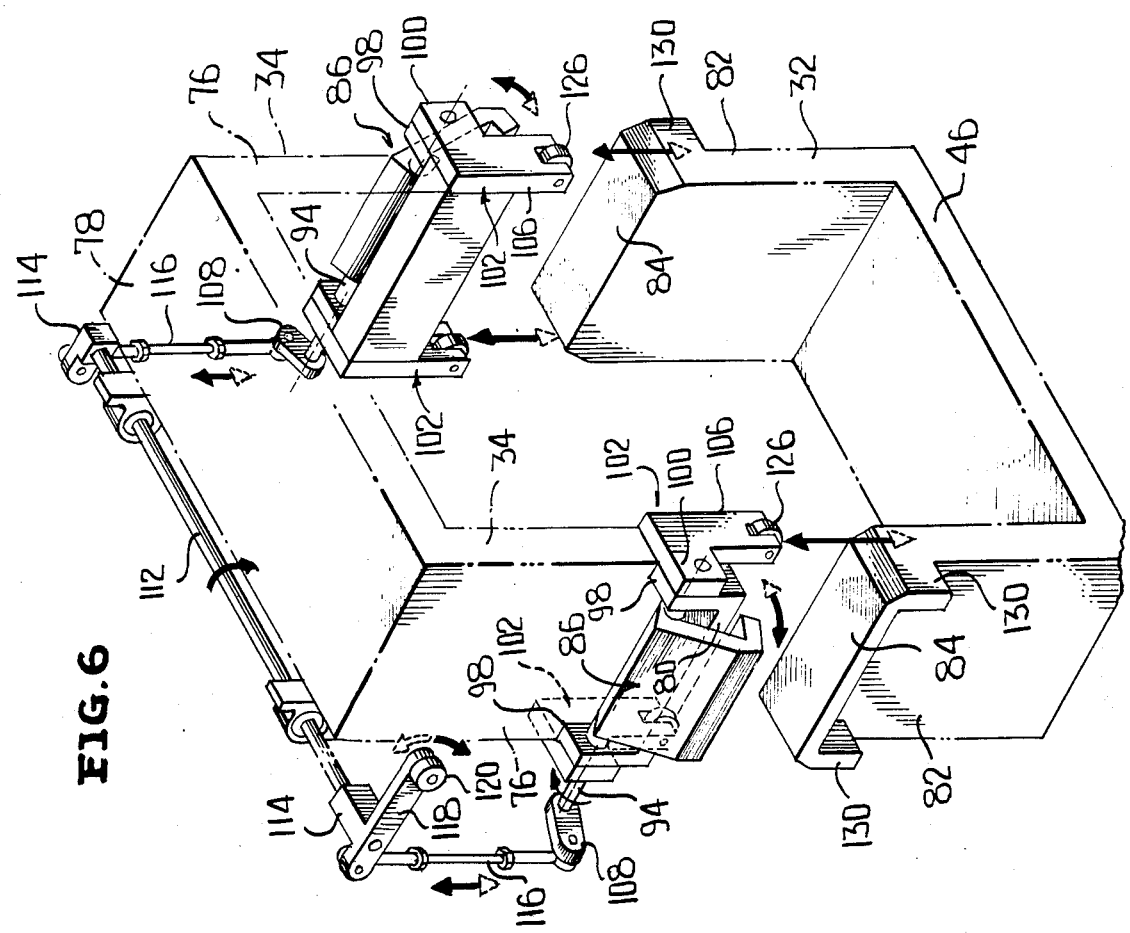
FIG. 6 is a perspective view with parts shown by way of phantom lines of the means for retaining the carriers in a mold closing position, the carrier being shown in spaced relation.
Figure 9:
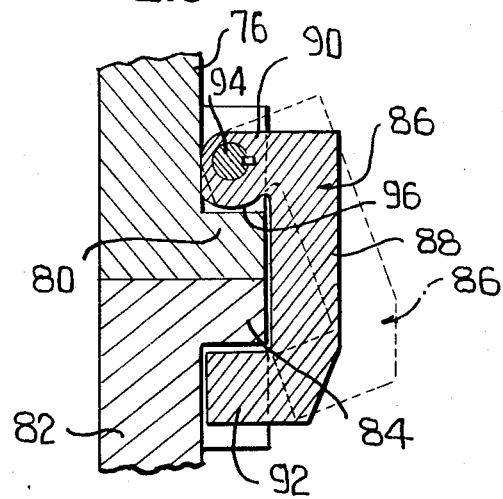
FIG. 9 is an enlarged fragmentary sectional view taken generally along the line 9—9 of FIG. 7 and shows most specifically the relationship of a retaining member for retaining the carriers in associated relation.

Referring now specifically to FIG. 9, it will be seen that a side wall 76 of the carrier 34 at the free end thereof remote from a base 78 of the carrier 34 is provided with a projecting locking flange 80. In a like manner, the opposite side wall 76 of the carrier 34 will be provided with a similar locking flange (FIG. 6).

Each side wall 82 of the carrier 32 remote from the base 46 thereof will also be provided with a locking flange 84. The locking flanges 80, 84 in the "closed" position of the carriers 32, 34 will be in opposed substantially touching relation. Thereafter a C-shaped cross sectional retaining member, generally identified by the numeral 86, will be engaged over the locking flanges 80, 84 to restrict separation of the carriers 32, 34. The retaining member 86 includes a base 88 and a pair of remote opposing retaining flanges 90, 92. It will be seen that the spacing of the flanges 90, 92 is such that the retaining member 86 may be readily pivoted into its carrier retention position when the locking flanges 80, 84 are substantially in touching relation. The retaining member 86 thus locks the flanges 80, 84 against separation and in a like manner locks the carriers 32, 34 against separation.

It will be readily apparent from FIG. 9 that the retaining flanges 90, 92 are spaced apart sufficiently for the retaining flange 92 to clear the locking flange 84. At the same time, the retaining flange 90 is carried by a pivot shaft 94 and has a rounded retaining face 96 which preferably has the axis of the pivot shaft 94 as its axis. It will be readily apparent that the retaining members 86 may be readily engaged with the locking flanges 80, 84 positioned therebetween.

Once the pressure pack 72 is energized, the locking flanges 80, 84 will move apart as permitted by the retaining member 86 and the locking flanges 80, 84 will engage the associated retaining flanges 90, 92.

The means for actuating and positioning the retaining members 86 is believed to be clearly shown in FIG. 6.

First of all, it will be seen that each of the locking flanges 80 has at its ends radially outwardly directed legs 98. Immediately adjacent each leg 98 is a transverse leg 100 of an angle bracket 102 which is secured to an edge of the respective side wall 76 by means of a plurality of fasteners 104. Each angle bracket 102 has a depending leg 106.

The legs 98, 100 have aligned bores in which there is journalled one of the pivot shafts 94. One end of the pivot shaft 94 is provided with a crank arm 108 for pivoting the pivot shaft 94 and thus positioning the retaining member 86.

In order that the two retaining members 86 may be positioned in unison, there are mounted on the side wall 76 of the carrier 34 remote from the carrier 32 a pair of bearing blocks 110 (FIG. 8). A control shaft 112 is rotatably journalled in the bearing blocks 110 with the control shaft 112 extending transversely of the pivot shafts 94.

A crank arm 114 is carried there by each end of the control shaft 112 with each of the crank arms 114 being generally aligned with the respective one of the crank arms 108. An adjustable link 116 extends between and is pivotally connected to each set of crank arm 108 and crank arm 114.

Further, one of the crank arms 114 is provided with an arm extension 118 which carries a cam follower 120. The cam follower 120 engages with a cam to be described in detail to position the retaining members 86 in a carrier retaining position after the carriers 32, 34 have been moved together and a further cam operation opens retaining members 86 before the carriers are to be moved apart in the opening of the mold 36.

Figure 10:
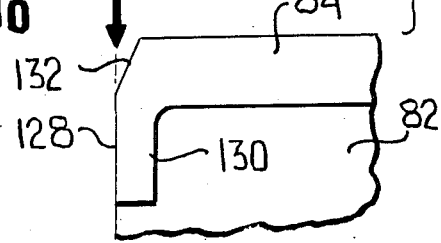
FIG. 10 is an enlarged fragmentary elevational view showing both the details of mounting of one of the retaining members as well as the mounting of a roller type guide and an associated portion of the other of the carriers.

Referring now to FIG. 10, it will be seen that each angle bracket 102 has the leg 106 thereof provided on opposite sides thereof with a notch 122. The notch 122 receives a projecting rib 124 on the locking flange 80 so as to facilitate the proper positioning of the angle bracket 106.

Further, the radially inner free end of the leg 106 carries a roller 126. The roller 126 is positioned for engaging an outer surface 128 of a flange 130 depending from a respective end of the locking flange 84. To facilitate alignment of the surface of the roller 126 with the surface 128, the extreme end of the locking flange 84 is provided with a slightly beveled surface 132. The rollers 126, in conjunction with the surfaces 128, thereby assure proper alignment of the carriers 32, 34.

Referring once again to FIG. 1, it is to be understood that in the operation of the blow molding apparatus 20, a continuous tubular parison will be extruded from an extrusion head (not shown) at the right side of the frame 20 in alignment with and between the mold halves 38, 40 when open. The molds 36 will be closed about this tubular parison at about the 90° position as viewed in FIG. 1. Thus generally at the 90° position there will be a cam assembly, generally identified by the numeral 140. The cam assembly 140 will serve to effect pivoting of the retaining members 86 to their operative position shown in solid lines in FIG. 9.

It is also to be understood that the molds 36 will be opened in sequence generally at the 11 o'clock position. Accordingly, slightly in advance of the 11 o'clock position there is a second cam assembly, generally identified by the numeral 142. The cam assemblies 140, 142 are basically identical except for being of reverse hand.

It is to be understood that when the cam follower 120 is associated with the cam assembly 142, the retaining members 86 will be pivoted away from the locking flanges 80, 84 to the dotted line position of FIG. 9.

It is to be understood that the cam assemblies 140, 142 will be of a special construction and only the cam assembly 142 will be described in detail here.

Referring now to FIGS. 3 and 4, it will be seen that there is illustrated a portion of the frame 22. On the frame portion 22 there is an elongated guide or track member 144 having end plates 146, 148. As is best shown in FIG. 5, the track 144 is provided with a T-shaped groove 150.

A cam support 152 is slidably mounted on the track 144 and is provided with a T cross sectional projection 154 which is engaged in the groove 150. The cam support 152 is provided with a pair of end plates 156, 158.

The cam support 152 is mounted for adjustment transversely of the path of the cam 120. The cam support 152 is adjustably positioned by means of a positioning screw 160 which extends through a threaded bore 162 in the cam support 152. One end of the positioning screw 160 is rotatably journalled in the end plate 148 and restrained against axial movement as at 164 while the other end of the positioning screw 160 is rotatably journalled in the end plate 146 as at 166. By rotating the positioning screw 160, the cam support 152 may be adjusted lengthwise of the track 144.

The cam support 152 carries a cam element 168 which is best illustrated in FIG. 2. The cam element 168 has a wide entrance opening 170 and a wide exit opening 172 joined by an intermediate cam track portion 174.

While the cam element 168 is normally fixedly positioned relative to the cam support 152, it is movable under certain load conditions as will be explained hereinafter. Accordingly, the cam element 168 is mounted between the end plates 156, 158 for movement parallel to the track 144. To permit this movement, as is best shown in FIGS. 3 and 4, the cam element has projecting from the central portion thereof at one side thereof a mounting pin 176 which is secured in a bore 178 by means of a set screw 180. A like, but longer pin 182 extends from the central portion of the opposite side of the cam element 168 and has one end thereof positioned within a bore 184 in the cam element 168 by way of a set screw 186.

The end plate 156 is provided with a bushing 188 through which the pin 176 passes. A similar, but different bushing 190 is threaded into the end plate 158 and receives the pin 182.

There is mounted on the pin 182 between the cam element 168 and the bushing 190 a compression spring 192. The compression spring 192 normally holds the side of the cam element 168 from which the pin 176 projects against the end plate 156. This is the normal position of the cam element 168.

It is to be understood that under normal operating conditions, very little pressure is exerted between the cam follower 120 and the cam elements 168 to open the mold carriers 32, 34 by pivoting the retaining members 88 to their dotted line positions of FIG. 9. In a like manner, very little pressure is exerted by the cam follower 120 on a cam element 194 of the cam 140 to effect pivoting of the retaining members 86 to their operative solid line positions of FIG. 9.

However, mishaps do occur during improper operation of the blow molding apparatus 20. For example, the pressure pack 72 is to be vented prior to the cam follower 120 reaching the cam element 168. When the pressure pack is properly vented, there is no internal pressure within the mold half carriers 32, 34 and the locking flanges 80, 84 would be in touching or substantially touching relation so as to permit the ease of pivoting of the retaining members 86 from their solid positions of FIG. 9 to their dotted line positions. On the other hand, if proper venting does not occur, the locking flanges 80, 84 may jam against the retaining flanges 90, 92 and resist pivoting of the retaining members 86 to their released positions. Should this occur and the cam element, for example, be fixed, the control linkage for effecting pivoting of the retaining elements 86 would become damaged.

A like situation may occur during the closing of the molds if the mold half carriers 32, 34 are not properly brought together.

However, by floatingly mounting the cam elements 168, 194 in their respective cam support 152 and utilizing the proper compression spring 192, normal operation of the retaining members 186 may be effected while still permitting the cam elements to move to positions wherein the cam followers 120 may pass therethrough without damage to the linkage.

With reference to FIGS. 1 and 4, it will be seen that there will be associated with the cams 140, 142 a switch 194 having an actuator 196 in position with respect to its respective cam element, for example the cam element 168 or the cam 142, so that once the cam element has been moved a predetermined excessive amount, the switch 194 will be moved to a position wherein the blow molding apparatus 20 will be immediately shut down to prevent any damage.

Although only a preferred embodiment of the invention has been specifically illustrated and described herein, it is to be understood that minor variations may be made therein without departing from the spirit and scope of the invention as defined by the appended claims.

I claim:

1. A mold mounting unit for a split mold of a molding apparatus, said mold mounting unit comprising first and second mold half carriers disposed in opposed aligned relation, means carried by each of said mold half carriers for mounting a mold half, said mold half carriers having a pair of opposed locking flanges along two sides thereof, retainer means for selectively restricting separation of locking flanges of each pair, said retainer means being in the form of a C-shaped cross sectional member having spaced retaining flanges for receiving therebetween locking flanges of an associated pair of locking flanges.

2. A mold mounting unit according to claim 1 wherein said locking flanges have remote surfaces opposing said retaining flanges, and the spacing between said locking flange remote surfaces when said carriers are engaged being less than the spacing of said retaining flanges.

3. A mold mounting unit according to claim 2 wherein one of said carriers has therein an expandable pressure pack for applying pressure to mold halves disposed in said carriers thereby separating said carriers to the extent permitted by said retainer means.

4. A mold mounting unit according to claim 1 wherein said locking flanges have remote surfaces opposing said retaining flanges, one of said retaining flanges being mounted on a pivot shaft, said one retaining flange having a rounded surface opposing said remote surface of an associated one of said locking flanges.

5. A mold mounting unit according to claim 4 wherein said rounded surface is of a radius having a center corresponding to an axis of said pivot shaft.

6. A mold mounting unit according to claim 1 wherein said locking flanges have remote surfaces opposing said retaining flanges, one of said retaining flanges of each of said C-shaped cross sectional members being mounted on a pivot shaft, a crank arm coupled to each of said pivot shafts, a control shaft in plan extending at right angles to said pivot shafts, crank arms on said control shaft aligned with said pivot shaft crank arms, a link connecting each of said pivot shaft crank arms to a respective one of said control shaft crank arms whereby said C-shaped cross sectional members are positioned in unison, and a position control arm secured to said control shaft.

7. A mold mounting unit according to claim 6 wherein said position control arm carries a cam follower for engagement by cams to effect movement of said C-shaped cross sectional members to a retaining position and to a releasing position.

8. A mold mounting unit according to claim 7 wherein said carriers are mounted on a rigid support for movement in alignment towards and away from each other, means mounting said rigid support for rotation about a fixed axis with said rigid support radiating from said fixed axis, and said cams being mounted in fixed positions along a path of said cam follower about said axis.

9. A mold mounting unit according to claim 8 wherein each of said cams includes a cam element movable under pressure engagement by said cam follower in the event of a mechanical mishap, and spring means resisting such movement of said cam element and normally holding said cam element in its operative position for engagement by said cam follower.

10. A mold mounting unit according to claim 9 wherein said carriers are radially adjustable on said rigid support, and there are means for radially adjusting the positions of said cams to align said cams with said path of said cam follower.

11. A mold mounting unit according to claim 10 wherein, for each of said cams, said means for radially adjusting the position of said cam includes a radially extending track, a cam support slidably mounted on said track, a positioning screw fixed axially relative to said track and threadedly engaging said cam support.

12. A mold mounting unit according to claim 11 wherein said cam element has a guided connection with said cam support, and retaining pins projecting radially from said cam element in guided relation in said cam support.

13. A mold mounting unit according to claim 8 wherein said carriers are radially adjustable on said rigid support, and there are means for radially adjusting the positions of said cams with said path of said cam follower.

14. A mold mounting unit according to claim 13 wherein, for each of said cams, said means for radially adjusting the position of said cam includes a radially extending track, a cam support slidably mounted on said track, a positioning screw fixed axially relative to said track and threadedly engaging said cam support.

15. A mold mounting unit according to claim 1 wherein said locking flanges have remote surfaces opposing said retaining flanges, one of said retaining flanges of each of said C-shaped cross sectional members being mounted on a pivot shaft, said carriers are mounted on a common support for substantially maintaining said aligned relation, said pivot shafts being carried by one of said carriers, said one carrier having at opposite edges of each side thereof an angle bracket having two legs, one of said legs forming a general continuation of said one carrier and carrying a guide roller, the other of said carriers having a guide surface for each guide roller, and the other leg of each angle bracket forming journal means for a respective one of said pivot shafts.

16. A mold mounting unit according to claim 15 wherein each of said locking flanges carries at ends thereof a pair of legs, said locking flange legs of said one carrier being adjacent said brackets other legs and also forming journals for said pivot shafts, and said locking flange legs of the other of said carriers defining said guide surfaces.

* * * * *